May 10, 1927.
G. W. NELSON
1,628,419
DISINTEGRATOR
Filed Aug. 4, 1926  2 Sheets-Sheet 2
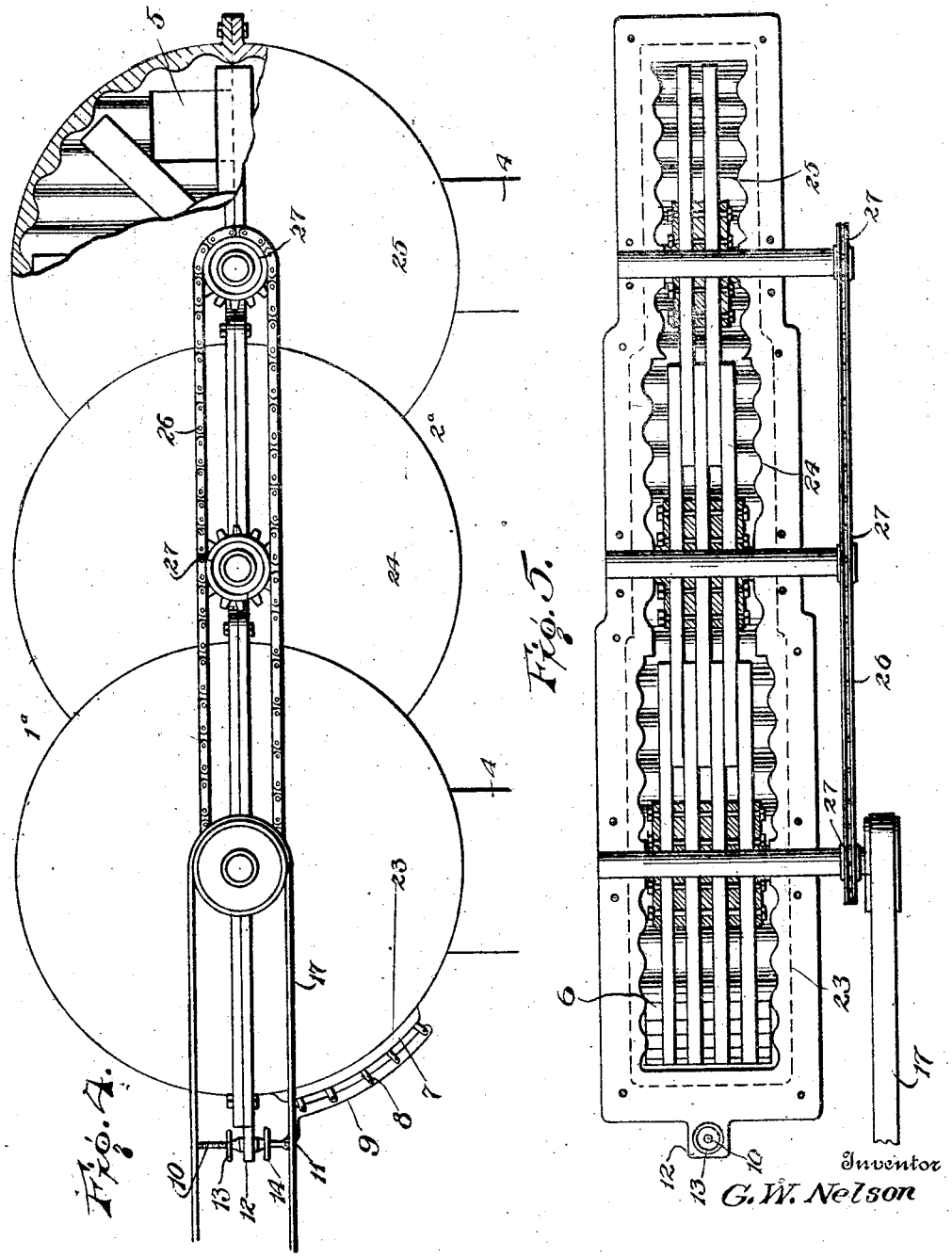

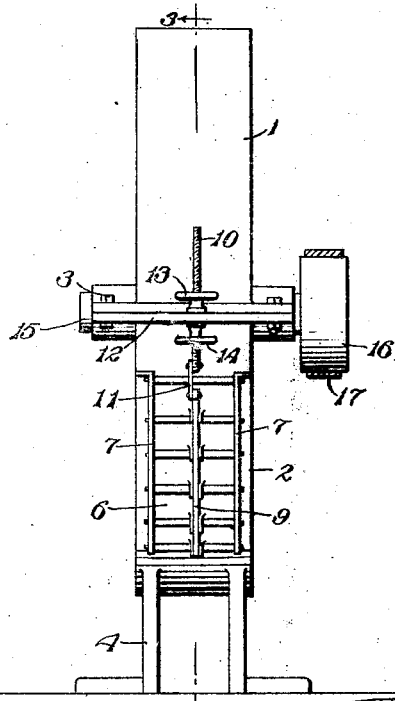
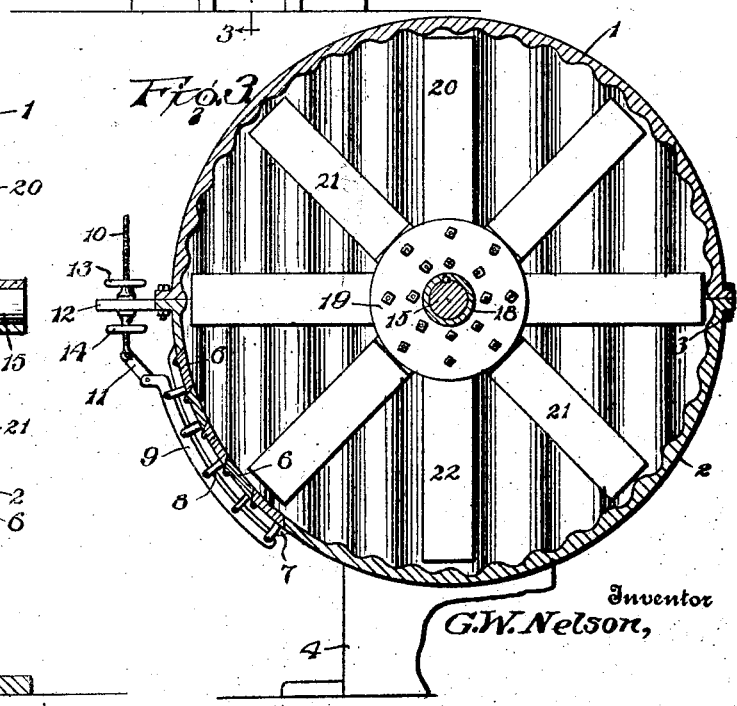

Patented May 10, 1927.

1,628,419

UNITED STATES PATENT OFFICE.

GUST W. NELSON, OF CLOQUET, MINNESOTA.

DISINTEGRATOR.

Application filed August 4, 1926. Serial No. 127,036.

The invention relates to a machine for comminuting material such as wood, rags, cereal, or the like requiring to be ground, crushed or pulverized.

The invention provides a machine embodying a casing and a rotary beater, the walls of the casing being corrugated and the beater cooperating therewith to reduce or comminute the material to be crushed or ground.

The invention in its simplest form contemplates a casing having an inlet and a variable outlet which may be regulated to determine the fineness of the material when reduced by being ground or crushed, and a rotary member in the casing cooperating therewith to comminute or otherwise reduce the material.

The invention also provides a machine including a casing and a plurality of coacting rotors therein disposed to operate upon the material in successive order, all as set forth more fully hereinafter.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is an elevational view of a disintegrator embodying the invention,

Figure 2 is a vertical, central sectional view thereof,

Figure 3 is a sectional view on the line 3—3 of Figure 1, looking to the left as designated by the arrows, Figure 4 is a side view of a modification, a portion of the casing being broken away, and Figure 5 is a top plan view of the modified form with the upper portion of the casing removed, and showing the rotors in section.

Corresponding and like parts are referred to in the following description and designated in the several views of the drawings by like reference characters.

The disintegrator comprises a casing and one or more rotary beaters therein, the length of the casing depending upon the number of rotary beaters therein, otherwise the construction is substantially the same.

For convenience the casing is shown as comprising an upper part 1, and a lower part 2, each of the parts preferably consisting of a casting, the inner walls of which are corrugated, or otherwise roughened to facilitate the disintegrating action. The meeting portions of the parts 1 and 2 are outwardly flanged and coincidentally apertured to receive bolts or analogous fastenings 3. The lower portion 2 of the casing is provided with a stand 4 which constitutes a mount, or support for the apparatus. The numeral 5 designates an opening in a side of the casing through which the material to be ground, crushed, or pulverized is supplied to the casing. The front of the lower portion 2 of the casing is formed with an opening for the discharge of the comminuted material and this opening is closed by a plurality of slats 6 which are pivoted at their ends to outwardly disposed flanges 7 at opposite sides of the opening. The meeting edges of the slats 6 are beveled, as shown most clearly in Figure 3, to admit of the slats when closed, lying in the same plane. An arm 8 projects outwardly from each of the slats 6 and a bar 9 connects the arms 8 and insures a simultaneous movement of the slats when it is required to adjust the same. Any suitable means may be provided for operating the bar 9 and securing the same in the required adjusted position. As shown, a threaded stem 10 is connected by means of a link 11 with the bar 9 and passes through an extension 12 of the casing and receives an upper nut 13 and a lower nut 14. By backing one of the nuts and advancing the companion nut, the stem 10 is adjusted longitudinally to open the slats 6 more or less, to regulate the discharge of the material when comminuted.

A shaft 15 is mounted in the sides or heads of the casing and for convenience, bearings are partly provided in the meeting portions of the upper and lower parts of the casing, to receive the shaft and, in this manner, the shaft and beater may be readily placed in position or removed, as required. Any suitable means may be provided for imparting rotary movement to the shaft 15 and for convenience a pulley 16 fast to an end of the shaft 15 is adapted to be driven from a suitable source of power, not shown, by means of a belt 17.

A rotary beater is mounted upon the shaft 15 and consists of a hub and arms secured to the hub and radiating therefrom. The hub includes a sleeve 18 and spaced flanges 19 between which the inner ends of the arms are received and secured. The beater may include two sets of arms 20 and 21, the arms 20 being slotted resulting in the provision of spaced members, and the arms 21 which are single and of a width corresponding approximately to the space formed by the slots in the arms 20. The arms 20 and 21 alternate, the arms 20 being broad, whereas the arms 21 are narrow and disposed in the plane of the slots of the arms 20. In this manner the material is alternately acted upon by the two sets of arms and is quickly comminuted by the disposition of the arms assisted by the inner corrugated or roughened walls of the casing.

In the modification shown in Figures 4 and 5, the casing is elongated and comprises an upper portion 1ª and a lower portion 2ª. The casing includes a series of compartments 23, 24, and 25 having a tandem arrangement and each of the compartments contains a rotary beater, which is constructed substantially in the manner hereinbefore stated. The compartments progressively increase in width throughout the length of the casing, as shown most clearly in Figure 5, and this is made necessary to accommodate the beaters which progressively increase in width. The beater located in the compartment 25 contains two sets of arms which are transversely spaced. The beater contained in the compartment 24 contains three sets of arms which are spaced apart to admit of the arms of the beater located in the compartment 25 interleaving therewith. The beater contained in the compartment 23 contains four sets of arms which are spaced apart to accommodate the arms of the beater located in the compartment 24. The arms of the beaters are adapted to interleave or overlap for the greater portion of their length, as shown most clearly in Figure 5. The several beaters are connected for simultaneous rotation in the same direction and, as shown, a sprocket chain 26 connects sprocket wheels 27 fast to projecting ends of the shafts of the several beaters. The material is fed to the compartment 25 through an opening 5 in a side thereof and is advanced through the compartments 24 and 23, and discharged at the latter through the opening controlled by means of the slot 6.

Having thus described the invention, I claim:

1. A disintegrator comprising a casing, including a peripheral wall in which is formed an outlet, and side walls in one of which is formed an inlet, a plurality of pivoted slats closing the outlet and forming a continuation of the peripheral wall, means for pivotally adjusting the slats to produce a number of outlets of regulated size to determine the fineness of the material, and a rotary beater within the casing mounted in the side walls thereof.

2. A disintegrator comprising a casing including upper and lower cast metal parts having their inner walls corrugated or roughened, the lower part having a discharge opening and outer flanges at the sides of the discharge opening, a plurality of slats closing the discharge opening and pivoted to the outer flanges, said slats having their meeting edges beveled, means connecting the slats for simultaneous adjustment and a rotary beater within the casing comprising a hub and arms radiating from the hub, every other arm being broad and slotted, and the intermediate arms being narrow and disposed in the plane of the spaces formed by the slotted arms.

3. A disintegrator comprising an elongated casing including a plurality of compartments having a tandem arrangement and progressively increasing in width, the compartment at one end having a feed opening and the compartment at the opposite end having a discharge opening, means for regulating the effective size of the discharge opening, rotary beaters in the several compartments including arms which are adapted to interleave or overlap, and means for rotating the beaters in the same direction.

In testimony whereof I affix my signature.

GUST W. NELSON. [L. S.]